No. 678,622. Patented July 16, 1901.
T. B. JEFFERY & R. W. THOMPSON.
MOTOR VEHICLE DRIVING MECHANISM.
(Application filed Oct. 27, 1900.)

(No Model.) 3 Sheets—Sheet 3.

Witnesses.
Edward T. Wray.
Edgar L. Conant.

Inventors
Thomas B. Jeffery
Robert W. Thompson
by Burton & Burton their Atty's.

UNITED STATES PATENT OFFICE.

THOMAS B. JEFFERY AND ROBERT W. THOMPSON, OF CHICAGO, ILLINOIS; SAID THOMPSON ASSIGNOR TO SAID JEFFERY.

MOTOR-VEHICLE DRIVING MECHANISM.

SPECIFICATION forming part of Letters Patent No. 678,622, dated July 16, 1901.

Application filed October 27, 1900. Serial No. 34,544. (No model.)

*To all whom it may concern:*

Be it known that we, THOMAS B. JEFFERY, a citizen of the United States, and ROBERT W. THOMPSON, a subject of the Queen of Great Britain, both residing at Chicago, in the county of Cook and State of Illinois, have invented certain new and useful Improvements in Motor-Vehicle Driving Mechanism, of which the following is a specification, reference being had to the accompanying drawings, forming a part thereof.

Figure 1:
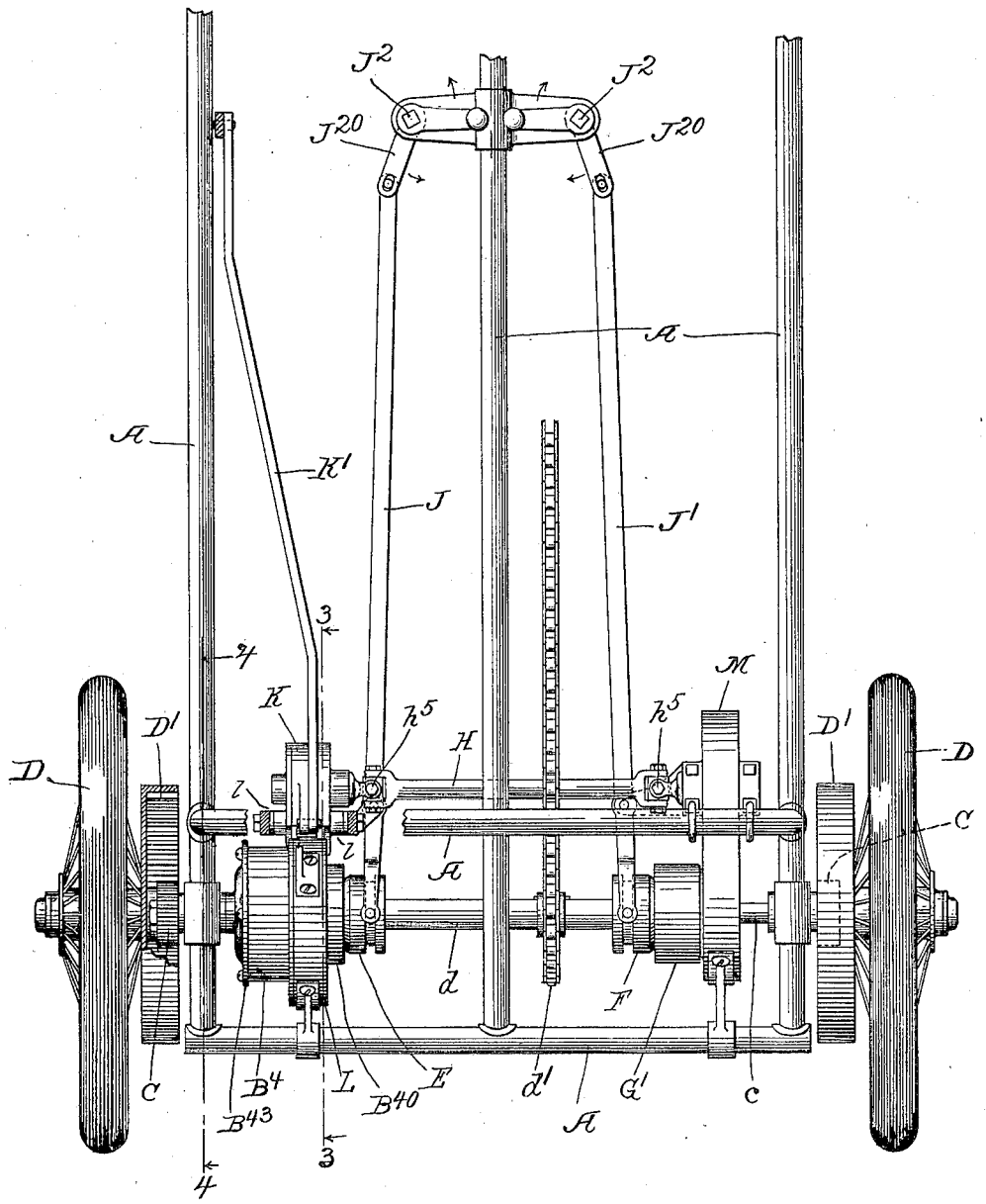
Figure 2:
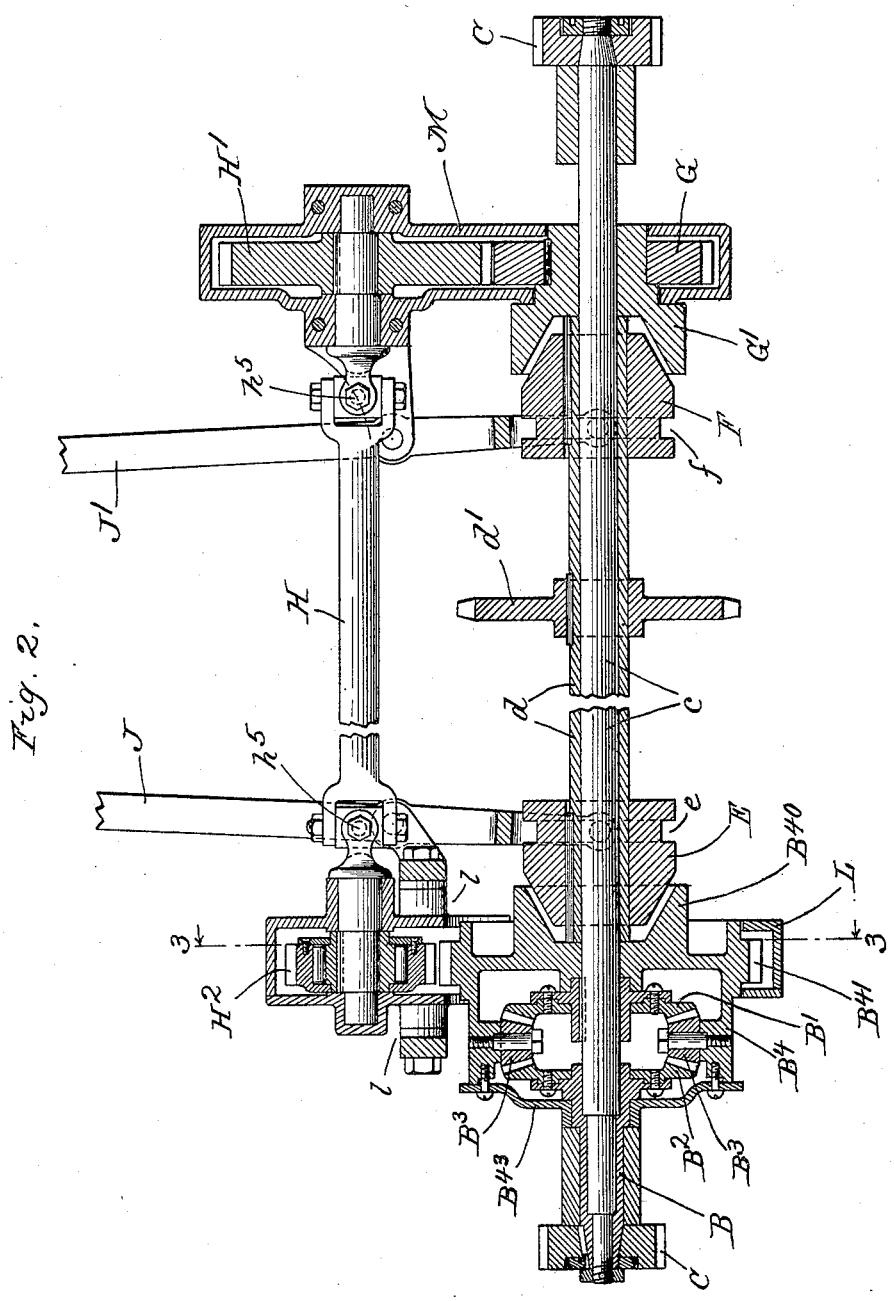
Figure 3:
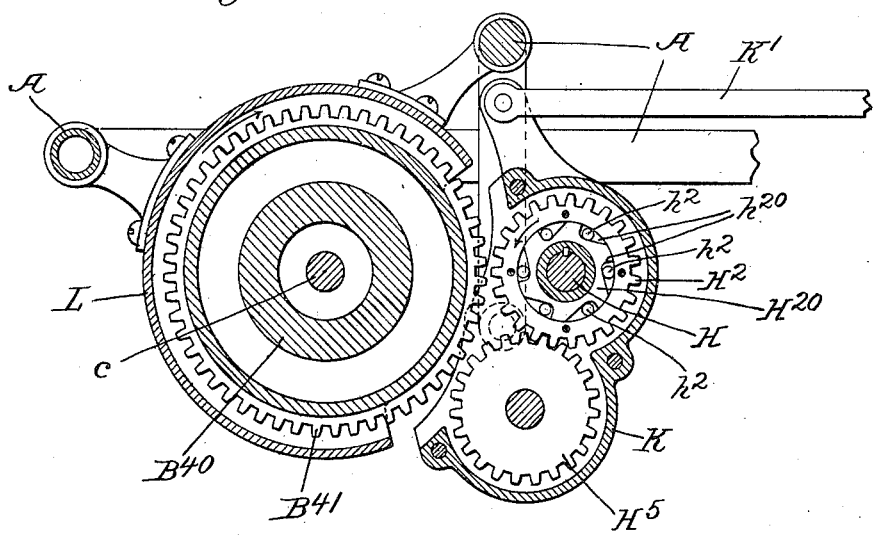
Figure 4:
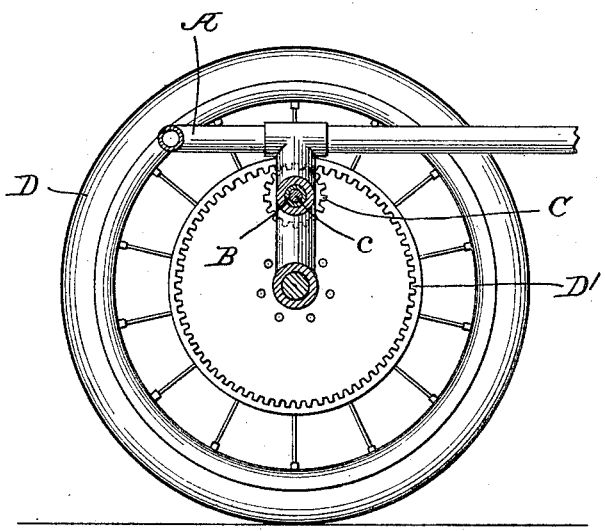

In the drawings, Figure 1 is a plan of our improved motor-vehicle driving mechanism. Fig. 2 is a horizontal section in the plane of the axis of the traction-wheel-driving shaft. Fig. 3 is a section at the line 3 3 on Figs. 1 and 2. Fig. 4 is a section at the line 4 4 on Fig. 1.

A A A represent bars of the running-gear frame of the vehicle.

D D are traction-wheels; C C, the driving-pinions, which mesh with the internal gear-rims D' D' of the traction-wheel.

$c$ is the shaft of the pinions C, which we term the "traction-wheel-driving" shaft. On this shaft is a compensating-gear train comprising the beveled gear B', rigid with the shaft, the beveled gear $B^2$, rigid with the sleeve B, which is loose on the shaft $c$, the intermediate pinions $B^3$ $B^3$, and the pinion-carrying element $B^4$, which is loose on the shaft, being journaled thereon outside the sleeve. This compensating-gear train operates in the familiar manner of such devices, except as specially modified by the hereinafter-explained mode of driving.

$d$ is a sleeve loose on the shaft $e$. It is driven by power communicated to it by the motor (not shown) by means of chains around the sprocket-wheel $d'$, which is fast on the sleeve. Cones E and F are feathered on the motor-sleeve $d$ toward its opposite ends, respectively. The cone E is adapted to engage the pinion-carrying element $B^4$ of the compensating-gear structure, said element having a suitable hub extension $B^{40}$, conically hollowed and adapted for making engagement with said cone. The other cone, F, is similarly adapted to engage the hub G' of the gear G, which is loose on a shaft $c$ at the end of the sleeve $d$ opposite that at which the compensating-gear train is located.

H is a counter-shaft journaled as hereinafter described. H' is a gear-wheel thereon, which meshes with and is driven by the gear-wheel G. $H^2$ is a gear-wheel on the opposite end of the counter-shaft. The pinion-carrying element $B^4$ on the compensating-gear structure is constructed peripherally as a gear-wheel having the gear-rim $B^{41}$, with which said gear-wheel $H^2$ meshes and drives it. The wheels G H' $H^2$ and the gear-rim $B^{41}$ of the pinion-carrying element $B^4$ are so proportioned that the train consisting of these four wheels is a speed-reducing train. The cone E and the correspondingly-hollowed hub $B^{40}$ of the element $B^4$ and the cone F and the correspondingly-shaped hub G' of the gear G may be taken as standing for any form of clutch device by which the motor-actuated element (the sleeve $d$) may be operatively connected with the wheels to which the elements $B^{40}$ and G', respectively, pertain. We have shown the conical elements fitting the one into the other as the simplest form of clutch and not because we design to limit ourselves to this particular form. When the cone E is engaged with the hub $B^{40}$, rotary movement is transmitted directly through the compensating-gear structure to the shaft $c$ and to the sleeve B, which rotate together at the same speed or at a differential speed, according to the conditions which ordinarily govern the speed of two wheels connected by differential gear. It is designed that the speed thus given to the shaft $d$, and thereby to the traction-wheel, shall be the higher speed of the two for which provision is made. When the cone F is engaged with the hub G' of the gear G, the speed-reducing train, consisting of the wheels G, H', and $H^2$, communicates the motion to the compensating-gear element $B^4$ modified in speed according to the construction of said train. It will be noticed that the shaft $c$ derives its movement through the compensating-gear train in precisely the same manner in both cases.

J J' are levers suitably fulcrumed on the running-gear frame, forked to engage the grooves $e f$ in the cones E and F, respectively, to shift said cones longitudinally on the sleeve D to throw them into and out of engagement with the coöperating elements of the clutches of which they are parts, respectively. These levers J and J' extend from their fulcrums forward to a suitable position where they may be manipulated in any convenient manner by the operator. As illustrated, we have shown at the forward end of each lever a vertical shaft $J^2$, having a lever-arm $J^{20}$ at the lower end, which engages with the lever, so that as the shaft is rocked by any suitable means, as by a crank-handle in the hands of the driver, the lever is oscillated about its fulcrum, so as to engage or disengage the clutch.

In operation the driver at starting the vehicle will first throw the cone F into engagement with the hub G', thereby starting the vehicle at the slower speed. When this speed has been attained, he will throw the lever provided to operate the cone E in direction to bring the cone into engagement with the hub $B^{40}$, giving the vehicle the higher speed. In order that it may not be necessary first to disconnect the clutch which operates the speed-reducing train to give the lower speed before engaging the clutch which gives the higher speed, we interpose in the speed-reducing train at any convenient point a clutch device adapted to drive in one direction only, permitting the driven element to be operated more rapidly than the driving element will drive it, after the ordinary manner of such a clutch. We have shown this clutch in the gear $H^2$, which has an inner element $H^{20}$ directly attached to the counter-shaft H and driving the outer element $H^2$, which constitutes the gear proper. The clutch devices, which are of familiar construction, consist of rollers $h^2$, riding in eccentric sockets $h^{20}$ in the central element $H^{20}$, so that rotation in one direction causes them to lie in the deepest part of the sockets, permitting the two elements to rotate without regard to each other. This clutch device is desirable independently of the purpose of continuing the engagement of both clutches at the same time in order to prevent the running of the speed-reducing train at all times, whether it is operating or not, as it would evidently do but for such a clutch. With such a clutch the friction and loss of power from running this train will be saved whenever that friction would be greater than the friction in the clutch. This particular necessity for the clutch is obviated, however, by the construction of the reversing devices, which will now be described.

In order to give a reverse movement to the vehicle for the purpose of backing, we mount the gear $H^2$ in a bearing-frame K, and in the same frame we mount an equal gear $H^5$, which meshes with the gear $H^2$, the frame being fulcrumed at a point between the bearings of the two gears at such position that either gear, but not both at the same time, may be meshed with the gear-rim $B^{41}$ of the compensating-gear element $B^4$. This rocking frame K is suitably connected by a link K' with any means for oscillating it to effect one engagement or the other at will or to hold both the gears $H^2$ and $H^5$ out of engagement with the compensating-gear element $B^4$. The last-mentioned adjustment will usually be made when running at high speed to prevent running the speed-reducing train by mere friction. The change of position of the bearing of the gear $H^2$, due to the rocking of the frame K for the purpose of reversing the movement, necessitates flexibility in the counter-shaft H. This may be effected in any convenient way. We have shown as the most desirable method or device for the purpose two toggle-joints or universal-movement joints $h^5$ $h^5$ between the bearings of the shaft.

The entire gear-train is designed to be thoroughly housed. The pinion-carrying element $B^4$ of the compensating gear constitutes a housing for the compensating-gear train upon all except one side, which is closed by a disk $B^{43}$. The gear-rim of this element $B^4$ is itself inclosed in a housing L, suitably supported upon the running-gear frame, and the pivoted frame K, which has the bearings for the shafts of the gears $H^2$ and $H^5$, is constituted so as to form a housing for these gears, inclosing them as completely as consistent with the oscillatory movement which is required for the purpose of reversing, and the fulcrum-pivots for the frame K are obtained at $l$ $l$ on the housing L. The gears G and H' are inclosed in a housing M, which is supported so as to be rigid with the running-gear frame and which has the bearing for the counter-shaft H at that end.

We claim—

1. In a motor-vehicle driving mechanism, a traction-wheel-driving shaft; a motor-driven element loose thereon; means for operatively connecting at will said element and shaft; a speed-changing train, having its first wheel loose and its last wheel fast on the shaft; and a counter-shaft having intermediate wheels of the train; means for operatively connecting at will the motor-driven element with said first wheel; and a clutch comprised in the train and on the counter-shaft, which communicates motion in one direction only.

2. In a motor-vehicle driving mechanism, in combination with a traction-wheel-driving shaft and a motor-driven element loose thereon, a compensating-gear train comprising a fast and a loose gear and intermediate pinions, and a pinion-carrying element loose on the shaft, and means for operatively connecting said pinion-carrying element at will with the motor-driven element; said pinion-carrying element being a gear-wheel; and a speed-reducing train having its first wheel loose on the shaft, said train extending to and comprising the said pinion-carrying gear-wheel; and means for operatively connecting said first wheel of the speed-reducing train with the motor-driven element.

3. In a motor-vehicle driving mechanism, in combination with a traction-wheel-driving shaft and a motor-driven element loose thereon, a compensating-gear train comprising a fast and a loose gear and intermediate pinions, and a pinion-carrying element loose on the shaft; means for operatively connecting said pinion-carrying element at will with the motor-driven element, said pinion-carrying element being a gear-wheel; a speed-reducing train having its first wheel loose on the shaft, said train extending to and comprising said pinion-carrying gear-wheel and containing a clutch driving in one direction only for operatively connecting the first wheel of said speed-reducing train with the motor-driven element.

4. In a motor-vehicle driving mechanism, a motor-driven element, the traction-wheel-driving element, two differently-speeded trains arranged to connect said elements; means for engaging them respectively at will with the motor-driven element, and a reversing device in the slower-speed train.

5. In a motor-vehicle driving mechanism, a traction-wheel-driving shaft; a motor-driven element loose on the shaft; two wheels, one fast and the other loose on the shaft, beyond the opposite ends of the motor-driven element; a train which connects said two wheels; means for engaging said two wheels respectively with the motor-driven element; and a flexible counter-shaft having intermediate wheels of the train.

6. In a motor-vehicle driving mechanism, a traction-wheel-driving shaft; a motor-driven element loose on the shaft; two wheels, one fast and the other loose on the shaft, beyond the opposite ends of the motor-driven element; a train which connects said two wheels; means for engaging said two wheels respectively with the sleeve; and a universal-jointed counter-shaft having intermediate wheels of the train.

7. In a motor-vehicle driving mechanism, a traction-wheel-driving shaft; a motor-driven element loose on the shaft; two wheels, one fast and one loose on the shaft; means for engaging the motor-driven element at will with said fast and loose wheels respectively; a train which connects said wheels; a pivoted bearing carrying two intermeshing wheels of said train which are arranged to intermesh with the next wheel of the train, one at one position and the other at another position of the pivoted frame; and means for oscillating the pivoted frame from one position to the other at will.

8. In a motor-vehicle driving mechanism, a traction-wheel-driving shaft; a motor-driven sleeve loose on the shaft; two wheels on the shaft, one fast and the other loose; means for engaging the motor-driving wheel at will with the fast or loose wheel; a train which connects said wheels; a counter-shaft having intermediate wheels of the train; pivoted bearings for one end of the counter-shaft, said bearings carrying two intermeshing wheels of the train, arranged to intermesh with the next wheel of the train, one at one position and the other at another position of the pivoted frame; and means for oscillating the pivoted frame at will from one position to the other; said counter-shaft having universal joints to permit such oscillation.

9. In a motor-vehicle driving mechanism, a traction-wheel-driving shaft; a motor-driven sleeve loose on the shaft; a compensating-gear train comprising a gear fast on the shaft, a gear loose on the shaft, an intermediate pinion, and a pinion-carrying element loose on the shaft, all located at one end of the sleeve; a gear loose on the shaft at the other end of the sleeve; a gear-train connecting the last-mentioned wheel with the pinion-carrying element, and means for engaging the motor-driven sleeve with either said last-mentioned wheel or said pinion-carrying element at will.

Chicago, Illinois, October 22, 1900.

THOS. B. JEFFERY.
ROBERT W. THOMPSON.

Witnesses:
D. T. HENDERSON,
CHAS. S. BURTON.